United States Patent [19]

Hartman, Jr. et al.

[11] 4,009,575
[45] Mar. 1, 1977

[54] MULTI-USE ABSORPTION/REGENERATION POWER CYCLE

[75] Inventors: Thomas Hartman, Jr., 290 Lake Sue Drive, Winter Park, Fla. 32789; Ronald D. Evans; Bruce G. Nimmo, both of Maitland, Fla.

[73] Assignee: said Thomas L. Hartman, Jr., Winter Park, Fla. ; by said Ronald D. Evans and said Bruce G. Nimmo

[22] Filed: May 12, 1975

[21] Appl. No.: 576,449

[52] U.S. Cl. .................................. 60/648; 60/651; 60/671; 60/673; 60/698; 126/263; 23/260
[51] Int. Cl.² ......................................... F03G 7/00
[58] Field of Search ............ 60/649, 673, 648, 651, 60/671, 676, 698; 122/21; 126/263; 203/DIG. 20, 100; 23/260

[56] References Cited

UNITED STATES PATENTS 3,302,401  2/1967  Rockenfeller .................. 60/673 X Primary Examiner—Allen M. Ostrager
Attorney, Agent, or Firm—Julian C. Renfro

[57] ABSTRACT

A method, and apparatus for implementing the method, for simultaneously generating electrical power and producing refrigeration, utlizing an absorption/regeneration power cycle, and performing useful work with the heat rejected from the cycle. In the cycle, a working fluid is absorbed by a carrier fluid by an exothermic chemical reaction wherein the heat released is utilized to perform useful work. After absorption, the original fluids are regenerated by an endothermic chemical reaction with the required energy supplied by an external prime source. Surplus energy stored in the fluids after regeneration is extracted and utilized to generate electrical power, produce refrigeration, and provide internally required energy.

16 Claims, 1 Drawing Figure

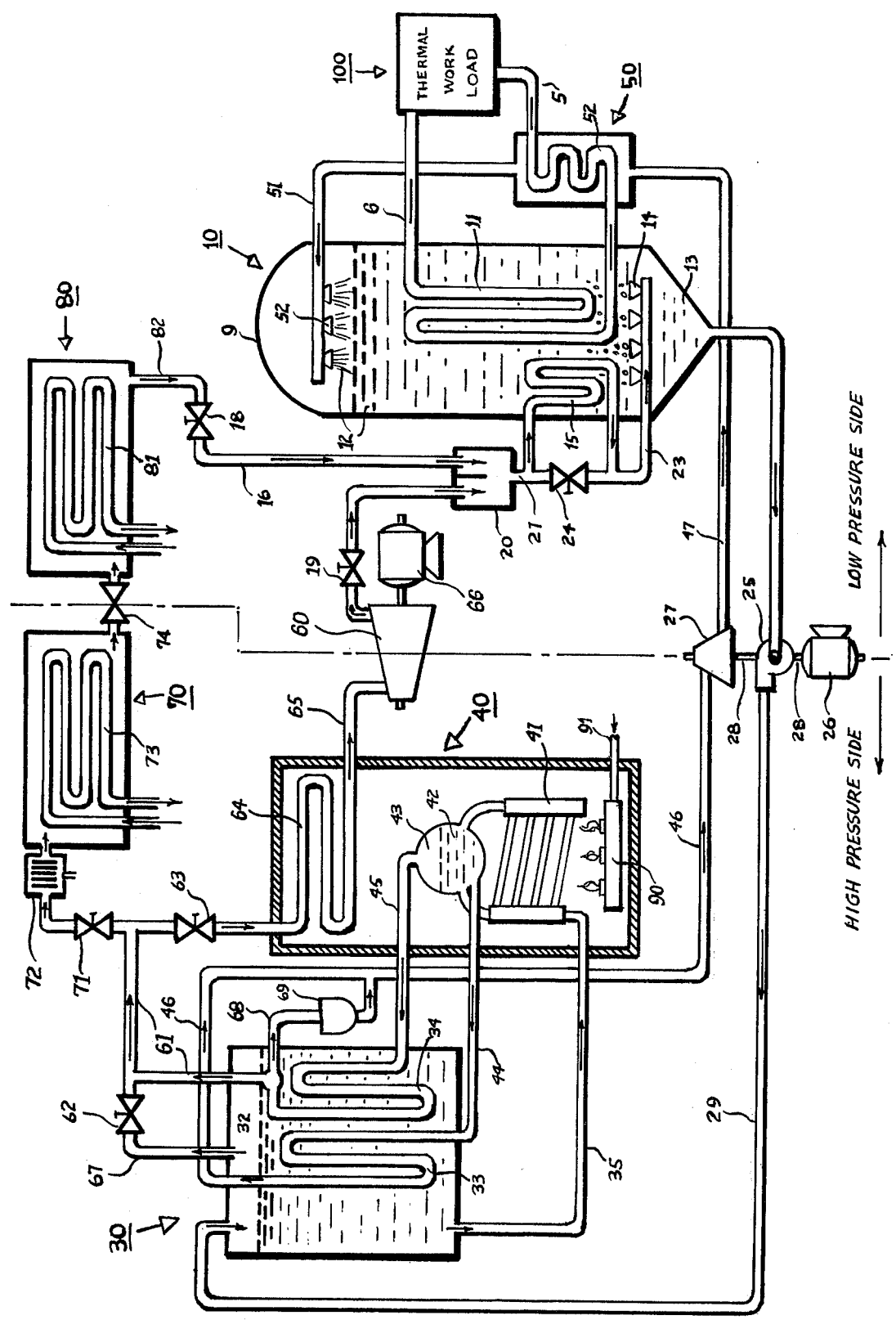

MULTI-USE ABSORPTION/REGENERATION POWER CYCLE

BACKGROUND OF THE INVENTION

Electrical energy demands in the United States are steadily increasing, whereas energy resources are continually decreasing. This situation emphasizes the need for improved and higher efficiency energy conversion systems. However, the majority of power generating systems utilize the Rankine cycle, which cycle appears to have been improved to the point that increasing its efficiency has become very difficult.

We have discovered that the absorption/regeneration cycle system that has been used extensively in refrigeration and air conditioning systems is capable of improvement to exceed the efficiency of the Rankine cycle. To this end, we have developed a novel method of utilizing this cycle for generating electrical power, producing refrigeration, and utilizing the waste heat from the cycle to perform additional useful work, thereby achieving this objective in an admirable manner.

The thermodynamic cycle efficiency of the most modern fossil fuel turbine type power plants may be in the range of 35 to 45 percent and therefore involves a large amount of waste heat. To achieve high turbine efficiency, the turbine exit pressure must be kept low and inasmuch as exit temperature is dependent on exit pressure, the waste heat is necessarily rejected at a lower temperature. Not only is this low waste heat temperature difficult to use for any useful purpose, but it also requires large volumes of cooling water and generates undesirable thermal pollution. By contrast, in the absorption/generation cycle, the heat rejection temperature is not solely dependent on the turbine exit pressure and it is possible to run with low turbine exit pressure and relatively high heat rejection temperature. Thus, the higher temperature associated with the heat rejection greatly increases the opportunity for effectively utilizing the rejected heat.

Prior art absorption/regenerative power cycle systems have been primarily utilized solely for refrigeration purposes and have used a variety of carrier fluid-working fluid pairs. For example, the Hartman U.S. Pat. No. 3,124,939 teaches a method of refrigeration using this power cycle, with carbon dioxide and potassium carbonate solution as the fluid pair. The Randel U.S. Pat. No. 1,922,217 recites the use of a mixture of butane and carbon dioxide with potassium carbonate, the $CO_2$ aiding in the flow of the butane. The Kasley U.S. Pat. No. 1,506,530 teaches a two-fluid closed cycle refrigeration process having a hermetically sealed system. A system for generating power from a refrigerant is described by Mamiya, U.S. Pat. No. 3,505,810. Latter patentee teaches the use of the refrigerant to drive a turbine after superheating. While the prior art has explored the absorption/regenerative power cycle, there has been no recognition of the novel capability of greatly increasing the overall efficiency of the cycle by a combination that increases the waste heat temperature to a range that can perform useful work while simultaneously generating electrical power and producing refrigeration.

SUMMARY OF THE INVENTION

Our method uses a gaseous working fluid at high pressure and temperature for driving a gas turbine, and for producing cooling in a conventional refrigeration cycle. As the gaseous working fluid completes its working function, it enters an absorbing unit via a conditioner at reduced pressure. In the absorbing unit, the gaseous working fluid combines chemically via an exothermic reaction with a liquid carrier fluid. Advantageously, the temperature at which the heat is released during this reaction may be in the region of 150° F to 300° F, and is therefore at sufficient temperature to perform various types of useful work. A typical and useful application is the desalination of salt water using a multistage flash distillation process. In this manner, the energy added at other points in the system that would otherwise be wasted is uniquely recovered and adds to the overall efficiency.

After absorption of the working fluid by the carrier fluid, the combined fluids are raised to a high working pressure by a liquid pump. The combined fluids are then subjected to a thermal regeneration process wherein the gaseous working fluid is separated from the carrier fluid. A two-step process is advantageously used, starting in a heat exchange and being completed in a regenerator or boiler. External prime energy from a heating element utilizing fossil fuel, nuclear energy or solar energy is entered into the cycle during the regeneration. After separation of the gaseous working fluid from the carrier fluid, the carrier liquid is returned to the absorber unit. However, it is to be understood that the carrier liquid is at a moderate temperature and high pressure as it exits the regeneration system and advantageously the energy contained therein can perform useful work. To reduce the pressure and thus recover energy, the carrier liquid is passed through a liquid turbine. The liquid turbine may be coupled to the pump, thereby reducing the prime power required for the pump. A pre-cooler is used to absorb the heat energy contained in the regenerated carrier liquid, reducing its temperature to a suitable level for most efficient subsequent absorption action. The absorbed heat in accordance with our invention is used to perform work as described hereinafter. The carrier fluid after cooling is introduced into the absorbing unit.

The working fluid, after separation in the regeneration system is of course in its gaseous state and is then directed to a gas turbine-generator, and to a refrigerating system. A first portion of the fluid is used to drive the turbine. This portion of the gas is superheated in the boiler to raise its temperature and thereby increase the turbine efficiency. Negligible pressure drop across the regenerator is assumed. Therefore, the superheated working fluid in its gaseous state is considered to be at the maximum system pressure. The gas is allowed to expand through the turbine, thus driving the generator and producing electrical power. The gaseous working fluid is exhausted from the turbine at a low pressure. In accordance with our invention, however, the reject heat is at a higher temperature than that of a steam turbine operating at comparable efficiency.

The remaining portion of the gaseous working fluid directed to the refrigeration system passes through a dryer to remove any moisture and thence to a condensing unit. In the condenser a cooling fluid removes the heat from the gaseous working fluid and converts the gas to its liquid state. As may be understood, the pressure is at its maximum at this point in the system. Next, the liquid is allowed to expand through an expansion valve into an evaporator. As the high pressure liquid working fluid vaporizes, it produces the desired refrigeration effect and then reverts to its gaseous state at a low pressure.

Referring back to the gas turbine exhaust, the low pressure gaseous working fluid exiting therefrom is to be combined with the low pressure gaseous working fluid returning from the evaporator and introduced into the absorbing unit. In accordance with our invention, it is necessary that temperatures and pressures of the fluids in the absorbing unit be at selected values which promote efficient and complete absorption of the working fluid by the carrier fluid. To this end, we have herein provided a novel conditioner in which the returning working fluid gases are combined so as to advantageously equalize their pressures, and in which the temperature of the combined gas is raised to the selected value. From the conditioner, the return gaseous working fluid is injected into the absorbing unit for absorption by the carrier fluid, thus completing the cycle.

As may be understood, this cycle although described in discrete steps, is in actuality a continuous cycle with an equilibrium reached at which time the various reactions hereinabove described will occur in proportion to the energy injected into and extracted from the system. It is also to be understood that the system contains various control valves and devices to allow selection by the user of a desired apportionment of energy transfer and work performed.

Returning now to the exothermic chemical reaction in the absorbing unit, the heat of reaction as the gaseous working fluid is absorbed by the carrier fluid is to be used to perform useful work. A heat exchanger coil is installed in the absorber unit through which a suitable heat-transferring fluid is circulated to carry the heat to where it is to be used. For example, the the liquid may be sea water and advantageously absorb sufficient heat to be usable in a multistage flash distillation process to remove the salt therefrom.

We have found that the maximum overall efficiency of our new and novel power generation system is achieved where the working fluid is carbon dioxide and the carrier fluid is an aqueous potassium carbonate solution. In the absorption process, the potassium carbonate is converted to potassium bicarbonate.

It is therefore an object of the invention to provide a method of obtaining power generation and refrigeration simultaneously from an absorption/regeneration power cycle system, and utilizing the waste heat therefrom for performing useful work, thereby achieving a high total system efficiency.

It is another object of the invention to provide apparatus for achieving the above object.

It is a further object of the invention to generate electrical power with less wasted energy than possible with a conventional Rankine cycle system.

It is still another object of the invention to provide a gas turbine operation wherein high turbine efficiency can be realized with a low pressure exit gas and a higher heat rejection temperature than feasible for a steam-driven turbine.

It is yet another object of the invention to minimize the net heat energy in a power generation system that must be dissipated in the atmosphere and in natural water sources, thereby minimizing thermal pollution.

These and other objects and advantages of our invention will become apparent from the detailed description provided hereinafter.

BRIEF DESCRIPTION OF THE DRAWING

The FIGURE is a schematic diagram of a preferred embodiment of apparatus to practice our method illustrating the flow of fluids and the elements of an absorption/regeneration power cycle system capable of simultaneous power generation and refrigeration, and utilization of rejected cycle heat.

DESCRIPTION OF THE PREFERRED EMBODIMENT

Referring now to the FIGURE, a schematic diagram shows the preferred embodiment of our invention. It is to be understood that the power generation and refrigeration system illustrated by the FIGURE is a continuous closed cycle. However, for purposes of explanation, absorber 10 is selected arbitrarily as the starting point of the cycle. The absorber consists of a vessel 9 holding a carrier fluid 12 in liquid or precipitate form. A working fluid in gaseous form is injected into the carrier fluid 12 by means of a set of nozzles 14. As described hereinabove, a number of fluid pairs are suitable to carry out the method of our invention. However, we have found that the use of carbon dioxide ($CO_2$) as the working fluid and an aqueous solution of potassium carbonate ($K_2CO_3$) as the carrier fluid are capable of producing the highest efficiency. Although we are not to be limited to the use of these fluids, the reactions in the cycle will be described in terms of carbon dioxide and potassium carbonate.

The use of carbonate solutions may have the tendency to corrode certain parts of the system. It is understood that we may include a small amount of anti-corrosion chemicals and catalysts in the solutions without affecting the principal reactions.

Absorber 10 is supplied with fresh liquid potassium carbonate solution 12 via nozzles 52. The carbon dioxide entering absorber 10 via nozzles 14 is absorbed by the potassium carbonate solution 12 in an exothermic reaction giving off an amount of heat equal to the heat of reaction of the two compounds. In the absorber 10 the carbon dioxide and the potassium carbonate solution may range from 15 to 100 psia.

The chemical reaction involved in the absorption process is:

$$CO_2 + K_2CO_3 + H_2O \rightarrow 2KHCO_3 \uparrow$$

The product of the reaction is a potassium bicarbonate solution 13 which collects at the lower part of vessel 9. The bicarbonate solution is carried by pipe 22 to pressure pump 25. Pump 25 is driven by suitable motive power, such as an electric motor 26, via shaft 28. Shaft 28 is also coupled to liquid turbine 27 to be described more fully hereinafter. Pump 25 serves to increase the pressure of the bicarbonate solution to a value required for the power generation and refrigeration functions. From the pump 25 the bicarbonate solution is carried to heat exchanger 30 by pipe 29 at which point a regeneration process is initiated.

In the regeneration process, the carbon dioxide is extracted from the potassium bicarbonate solution leaving an aqueous solution of potassium carbonate. The fluid 31 in heat exchanger 30 is heated by heat exchanger coils 33 and 34 that are carrying hot fluids as decribed hereinbelow. The heat thus absorbed causes some of the carbon dioxide gas to be released and collect as a gas in region 32 at the top of heat exchanger vessel 36. As can now be recognized, fluids 31 consist of a mixture of potassium bicarbonate, potassium carbonate, and water.

Fluid 31 is carried by pipe 35 to regenerator 40 wherein the balance of regeneration of the bicarbonate solution takes place. Regenerator 40 consists basically of tube boiler 41 having a burner 90 supplied with fuel via pipe 91. Obviously, we are not to be limited to the use of a tube boiler, or to this form of heat resource, for such are merely exemplary. Fluid from the heat exchanger 30 entering boiler tubes 41 is heated from burner 90 causing most of the remainder of carbon dioxide in the fluids to boil off and collect in region 43 of boiler 41. The remaining fluid 42 is potassium carbonate in a water solution as indicated by the reaction,

$$\downarrow 2KHCO_3 \rightarrow CO_2 + K_2CO_3 + H_2O$$

The carbonate-water solution 42 is carried by pipe 44 through heat exchanger coil 33 providing heat to heat exchanger 30 as mentioned previously. The hot, high pressure carbonate solution then flows via pipe 46 to turbine 27 which is essentially a liquid-operated turbine through which the carbonate solution is allowed to expand dropping its pressure to a relatively low value. The liquid turbine 27 is coupled to pump 25 as previously described and the energy recovered by liquid turbine 27 therefore will provide a part of the energy required to drive pump 25.

The carbonate solution leaving liquid turbine 27 is now near the pressure level of absorber 10 by virtue of the pressure drop across liquid turbine 27. However, due to the fact that heat exchanger 30 is inherently not capable of removing all of the heat introduced into the regenerated carbonate solution by boiler 41, the solution is at a higher temperature than the liquid in absorber 10. Therefore, cooler 50 is required to reduce the carbonate solution temperature to a selected value to promote the desired absorption reaction in absorber 10. To this end, the carbonate solution from liquid turbine 27 is carried by pipe 47 through cooler 50. A cooling liquid is circulated from pipe 5 through cooling coil 52 to remove the desired amount of heat from the carbonate solution. As will be described in detail hereinafter the heat absorbed by the cooling liquid in coil 52 is advantageously used to perform useful work. Though not shown in our schematic diagram, it is to be understood that conventional control valves and bypass valves may be associated with cooler 50 to adjust the cooling action of cooler 50 to cool the carbonate solution to the selected temperature.

After cooling in cooler 50, the carbonate solution flows via pipe 51 to nozzles 52 into absorber vessel 9, thereby completing the absorption-regeneration cycle with respect to the working fluid.

Returning now to regenerator 40, the released carbon dioxide gas and water vapor collecting in region 43 of boiler 41 as previously discussed is conveyed by pipe 45 to heat exchanger coil 34 in heat exchanger 30. A purpose of coil 34 is to condense the water vapor carried along with the carbon dioxide gas. Heat from the vapor is absorbed by the cooler bicarbonate solution 31 being carried past coil 34 thereby causing condensation. The condensate is carried via line 68 to steam trap 69 which is vented to pipe 46 and therein mixes with the carbonate returning to liquid turbine 27. The carbon dioxide flowing from boiler 41 through coil 34 issues from heat exchanger 30 through pipe 61. Carbon dioxide released from the bicarbonate solution in heat exchanger 30 collects in region 32 as discussed hereinabove. The collected carbon dioxide issues from region 32 via outlet 67 and valve 62 which controls its flow into pipe 61 where it combines with the flow from coil 34. The carbon dioxide is at this point in the cycle available at high pressure for performing useful work in accordance with our invention.

It is here appropriate to discuss typical pressure and temperature values in accordance with our invention. To obtain practical power generation from a gas turbine-generator combination such as turbine 60 and electrical generator 66 to be discussed hereinbelow, inlet pressures of the gas of up to 2000 psia are desirable. Therefore, pump 25 is required to produce the required pressure in heat exchanger 30 and regenerator 40. Since the regeneration process is essentially one of boiling the potassium bicarbonate solution to release the carbon dioxide, the required regenerator temperature will be the boiling point of the liquid at the selected pressure.

Returning now to the figure, carbon dioxide flows from heat exchanger 30 via pipe 61 to flow control valves 63 and 71. In accordance with our invention, selectable portions of the total carbon dioxide gas can be made available via valve 63 for use in generating electrical power, and via valve 71 for producing refrigeration. Considering the power generation phase of our invention first, it is assumed that valve 63 is open permitting a selected portion of the gas at the regeneration exit temperature and pressure to flow into superheater coil 64. Super heater coil 64 adds heat supplied by burner 90 to provide additional energy to the carbon dioxide gas. Gas turbine 60 is operatively connected to drive electrical generator 66. The superheated carbon dioxide flowing through pipe 65 is allowed to expand in gas turbine 60, thereby driving turbine 60 and generator 66. The turbine exit temperature and pressure of the carbon dioxide may be typically 100° to 300° F and from near atmospheric pressure to 100 p.s.i.a. respectively. Carbon dioxide as a working fluid for driving a turbine has an advantage over steam in that it has a very low vaporization point. Therefore, there is little danger of liquid droplets damaging the turbine blades. The small amount of remaining water vapor with the carbon dioxide can be prevented from condensing in the turbine by proper selection of turbine outlet conditions.

The exhaust carbon dioxide from turbine 60 is conducted via control valve 19 and pipe 17 to gas conditioner 20, preparatory to returning the gas to absorber 10 to be discussed in detail hereinafter.

Returning now to heat exchanger 30 wherein the regenerated carbon dioxide issues via pipe 61 at high pressure, the simultaneous operation of a refrigeration function in accordance with our invention will be discussed. Valve 71 is opened selectively as determined by the refrigeration capacity desired. As may be recognized, the carbon dioxide from heat exchanger 30 may have water vapor remaining that can seriously affect a refrigeration process. Therefore, we have provided drier 72 to remove such water vapor as may collect, with the discharge of the dryer being returned by suitable piping (not shown) to the absorber 10. Assuming valve 71 is open, the carbon dioxide flows through drier 72 to remove water vapor. The dry carbon dioxide gas then flows through condenser 70 in which the gas contacts cooling coil 73 having any appropriate cooling fluid flowing therethrough. Removal of heat from the carbon dioxide gas by coil 73 condenses the gas to its liquid form. The liquid carbon dioxide is next allowed to expand through expansion valve 74 into evaporator 80. As the liquid evaporates to its gaseous state, heat is extracted from the fluid flowing in evaporator coils 81, thereby achieving the desired refrigeration effect. The carbon dioxide gas output from evaporator 80 flows through pipe 82, control valve 18 and pipe 16 into conditioner 20.

As may be recalled at this point, low pressure exhaust carbon dioxide from turbine 60 enters conditioner 20 via pipe 17. Thus it is desired to combine this gas with the gas entering conditioner 20 via pipe 16 from the evaporator 80.

Conditioner 20 in accordance with our invention serves to precondition the two incoming carbon dioxide gas streams to ensure efficient absorption in absorber 10. Since the exit gas pressures from turbine 60 and evaporator 80 may not be identical, conditioner 20 allows mixing and equalizing of pressures. The conditioned carbon dioxide exits the conditioner 20 via line 21 to heating coil 15 which is immersed in the solution in vessel 9. The carbon dioxide circulates through coil 15 and its temperature is increased by the heat of reaction in absorber 10. From coil 15, the carbon dioxide flows through line 23 to nozzles 14 where it is allowed to bubble into the potassium carbonate solution 12. Absorption then takes place as described earlier. Thus, the working fluid absorption regeneration cycle is complete. Valve 24 bypasses heating coil 15 to allow adjustment of degree of heating of the carbon dioxide.

To clearly delineate the high pressure and low pressure regimes of the absorption-regeneration cycle, a broken line is included in the figure.

Turning now to an important feature of our invention, the manner in which heat rejected in the absorption process is utilized will be described. As may be recognized, the cycle has prime energy added at three points; namely, motor 26, burner 90, and evaporator 80. Neglecting normal losses and inefficiencies, energy is removed from the cycle at five points; namely, turbine 60 and generator 66, condenser 70, cooler 50, and absorber cooler coils 11. It is clear that the turbine-generator is the primary useful output from our invention. The energy rejected by condenser 70 represents useful work performed in the refrigeration process. Neglecting frictional losses, radiation and the like the remainder of the input energy thus must appear in the cooling liquid flowing out through pipe 6. This heat has been released from the continuing absorption reaction, and by design of the system in accordance with our invention, will be at a relatively high temperature as compared with waste heat from a Rankine cycle power system. For example, typical temperatures for this rejected heat may range from 150° to 300° F. This temperature is sufficiently high that a number of commercially valuable processes can be carried out using the heat transfer liquid in pipe 51 as the heat source. We have indicated this utility in the diagram as thermal work load 100.

An exemplary version of thermal work load 100 is a desalination plant for producing fresh water from sea water. A highly developed and widely used method is the multistage flash distillation process. This process is ideal for utilizing the absorption reaction heat in accordance with our invention. Full details of the multistage flash distillation process is given in "Engineering for Pure Water," *Mechanical Engineer*, January, 1968, pg. 18–25.

A comparison has been made beween the Rankine cycle and the carbon dioxide-potassium carbonate absorption-regeneration cycle when using waste heat to desalt sea water. To produce 40,000 gallons of fresh water per day a turbine outlet temperature of 271° F is required producing a cycle efficiency of 42.75% for the absorber system. The Rankine cycle for the same capacity requires a turbine outlet temperature of 151° F with a resulting cycle efficiency of 23.9%.

The increasing demands for fresh water in many parts of the world makes the combination of a plant for desalting sea water with an electrical power generating plant in accordance with our invention an ideal large scale application of this new and novel system. In addition to the significant increase in efficiency afforded by our invention over steam plants, platns, the harnessing of the waste heat significantly reduces the net volume of unusable heat. This, thermal pollution and the danger of damaging the ecology is lessened.

Other types of thermal work loads will be evident to those skilled in the technology. For example, use of water at 150° F and less is ideal for building heating, cleaning purposes, factory processes and similar uses where standard hot water heaters are used.

Additional methods of increasing the overall efficiency of the absorption-regenerative cycle that are within the scope of our invention include combining the cooling liquid flowing through cooling coil 73 of condenser 70, as shown in the FIGURE, with the fluids involved in handling thermal work load 100. The heat absorbed by this fluid is advantageously used in this variation to supplement the heat of reaction in performing useful work as described hereinabove.

Several other modes of operation are also considered to be within the scope of our invention. What may be termed a regenerative heat recovery mode can increase the efficiency of the power generation function. In this mode, valves 71 and 18 are closed and valves 63 and 19 fully opened so that all of the regenerated carbon dioxide gas is available for driving turbine 60. Turbine 60 is designed to operate at a much lower outlet temperature than the example previously considered. Lowering of the outlet temperature will result in increased energy transfer from the gas to the turbine 60 for a given inlet temperature and pressure, and outlet pressure. Practically, the carbon dioxide exhaust temperature may be reduced well below the operating temperature of absorber 10. In order for a maximum absorption reaction to occur, the entering carbon dioxide is required to be at a specific temperature relative to the potassium carbonate solution. Advantageously, we reduce the external use of the heat of reaction from absorber 10 and increase the flow of carbon dioxide in heating coil 15. Thus, the heat of reaction is used in a regenerative manner to increase the heat content of the carbon dioxide to a required specific temperature prior to its entering absorber 10. This novel arrangement thereby increases the electrical power available from generator 60, the additional energy being that recovered from the heat of reaction in absorber 10 in accordance with our invention.

Another mode of operation of our invention is the combination of refrigeration and use of the heat of reaction to perform useful work. In this mode, valves 63 and 19 are closed and valves 71 and 74 opened. The total regenerated carbon dioxide is then available for the refrigeration function. Both the heat removed from condenser 70 and from absorber 10 is then used to perform useful work, for example, in a multistage flash distillation desalination plant.

While we have described a preferred embodiment of our invention as well as alternative modes of operation, there are many variations that are within the scope of our invention. Such well known techniques as reheat and extraction may be included without departing from the spirit of our invention.

We claim:

1. Chemical absorption/regeneration apparatus for converting thermal energy to forms suitable for performing useful work at a high efficiency comprising:
   absorber means for causing an exothermic chemical reaction;
   first energy extraction means for extracting heat energy from said exothermic reaction;
   first work producing means arranged to utilize such first extracted heat energy;
   regeneration means for producing an endothermic chemical reaction, said reaction reversing said exothermic chemical reaction;
   second energy extraction means for extracting energy introduced by said regeneration means not required for said endothermic reaction; and
   second work producing means arranged to utilize such second extracted energy.

2. Apparatus for simultaneously generating electrical power and producing refrigeration from a closed-cycle absorption regeneration power system, and utilizing rejected heat from the cycle for performing useful work, comprising:
   a gaseous working fluid and a liquid carrier fluid;
   absorber means arranged to contain said carrier fluid in contact with said working fluid wherein said working fluid is absorbed by said carrier fluid by an exothermic reaction, producing a combined working and carrier fluid;
   heat absorbing means, said heat absorbing means disposed in the combined fluid and arranged to absorb the heat released from the exothermic reaction;
   thermal work-producing means operatively connected to said heat absorbing means for utilizing the absorbed heat;
   pump means for increasing pressure of said combined fluid to a selected high pressure;
   regeneration means, said regeneration means receiving said combined fluid from said pump means, and causing said combined fluid to separate into said gaseous working fluid and said liquid carrier fluid;
   power generation means, said power generation means operatively connected to said regeneration means and utilizing a portion of said separated gaseous working fluid as a motive force and thereby reducing the pressure of said working fluid;
   refrigerating means operatively connected to said regeneration means and utilizing a portion of said separated gaseous working fluid as a refrigerant, and thereby reducing the pressure of said working fluid; and
   means for returning said separated carrier fluid said separated working fluid in said absorbing means, said returning means serving to condition said fluids to promote said exothermic reaction.

3. The apparatus as defined in claim 2 in which said working fluid is carbon dioxide and said carrier fluid is an aqueous solution of potassium carbonate.

4. The apparatus as defined in claim 3 in which:
   said absorber means includes a vessel for containing said potassium carbonate solution, means for injecting said carrier fluid into said vessel, and nozzle means for injecting said carbon dioxide into said potassium carbonate solution.

5. The apparatus as defined in claim 2 in which said heat absorbing means includes a cooling coil, said coil carrying heat transfer fluid wherein the absorbed heat increases the temperature of said heat transfer fluid to 150° or greater, and in which said thermal work producing means comprises a multistage flash distillation apparatus.

6. The apparatus as defined in claim 3 in which said pump means includes an electric motor drive and in which said returning means includes liquid turbine means connected between said regeneration means and said absorber means arranged to return said separated potassium carbonate solution from said regeneration means and said absorber means, thereby reducing the pressure of said solution, and said turbine means arranged to deliver power to said electric motor drive.

7. The apparatus as defined in claim 3 in which said regeneration means includes heat exchanger means, said heat exchanger means having a vessel for receiving said combined fluids, a first heating coil arranged to carry high temperature potassium carbonate solution and a second heating coil arranged to carry high temperature carbon dioxide, said first and second coils disposed in said vessel, and boiler means, said boiler means having a burner for heating said boiler means, said boiler means connected to receive said combined fluids from said vessel, connected to deliver said potassium carbonate to said first heating coil, and connected to deliver carbon dioxide to said second heating coil.

8. The apparatus as defined in claim 7 in which said boiler means includes a superheater coil arranged to receive heat from said burner, said superheater coil connected to said vessel to receive carbon dioxide from said second heating coil, and in which said power generation means includes a gas turbine connected to drive an electrical generator, said gas turbine connected to said superheater coil and operative from superheated carbon dioxide.

9. The apparatus as defined in claim 8 in which said refrigerating means includes: dryer means, said dryer means connected to said regeneration means and arranged to receive carbon dioxide therefrom:
   condenser means, input of said condenser means connected to said dryer means and having cooling coil, said cooling coil carrying a cooling fluid for causing said carbon dioxide to change to its liquid state;
   expansion valve, said expansion valve connected to output of said condenser means and arranged to reduce the pressure of said liquid carbon dioxide;
   evaporator means, said evaporator means connected to said expansion valve and having a coil containing a medium to be refrigerated and wherein said liquid carbon dioxide changes to its gaseous state thereby refrigerating said medium.

10. The apparatus as defined in claim 8 in which said returning means includes conditioning means, said conditioning means connected to output of said gas turbine means and to output of said evaporator means and arranged to receive output carbon dioxide therefrom, said conditioning means equalizing pressure of said carbon dioxide and increasing the temperature of said equalized carbon dioxide.

11. The method of simultaneously generating electrical power and producing refrigeration from an absorption/regeneration power cycle system and utilizing rejected heat from the system, comprising the steps of:
 absorbing a gaseous working fluid in a carrier fluid by means of an exothermic reaction at low pressure, forming a combined fluid;
 performing useful work with the heat released by the exothermic reaction;
 pumping the combined fluid to a high pressure level;
 regenerating the combined fluid by separating the gaseous working fluid from the carrier fluid,
 expanding a portion of the high pressure gaseous working fluid through a gas turbine-generator thereby generating electrical power and reducing the pressure of the gaseous fluid;
 condensing a portion of the high pressure gaseous working fluid to its liquid state;
 evaporating the liquid working fluid, thereby producing refrigeration and reducing the pressure of the gaseous fluid;
 recombining the regenerated carrier fluid and the gaseous working fluid; and
 repeating the cycle as described.

12. The method as described in claim 2 wherein said regeneration step includes the steps of:
 heating the combined fluid to the boiling point of the working fluid;
 and boiling off the gaseous working fluid from the carrier fluid.

13. The method as described in claim 11 wherein said step of expanding a portion of the high pressure gaseous working fluid includes the step of:
 superheating the portion of the high pressure gaseous working fluid prior to expanding in the turbine.

14. The method of generating electrical power in a closed cycle absorption-regeneration system utilizing carbon dioxide and a potassium carbonate solution, and desalinating sea water utilizing the exothermic heat of reaction from the absorption portion of the cycle as the source of energy consisting of the steps of:
 a. absorbing carbon dioxide between atmospheric pressure and 100 psia, and a temperature greater than 150° F in an aqueous solution of potassium carbonate, thereby forming a solution of potassium bicarbonate and releasing heat of reaction;
 b. extracting the heat of reaction from the potassium bicarbonate and delivering said heat to a solution of sea water thereby raising the temperature of the sea water to greater than 150° F;
 c. distilling the heated sea water in a multistage flash distillation process, thereby producing fresh water;
 d. pumping the potassium bicarbonate solution to a high pressure;
 e. regenerating the potassium bicarbonate solution by adding heat slightly greater than the heat of reaction, and boiling off the carbon dioxide from the potassium bicarbonate solution, thereby leaving an aqueous solution of potassium carbonate;
 f. reducing the pressure of the residual potassium carbonate solution to near atmospheric pressure by causing the solution to expand through a liquid turbine;
 g. cooling the low pressure potassium carbonate solution to a temperature not less than 150° F;
 h. superheating the removed carbon dioxide to a temperature greater than the temperature of vaporization of the carbon dioxide;
 i. reducing the pressure and temperature of the removed carbon dioxide to a lower pressure and to decreased temperature by allowing the carbon dioxide to expand through a gas turbine arranged to drive an electrical generator, thereby generating electrical power;
 j. heating the low temperature, low pressure carbon dioxide exhausted from the gas turbine to a temperature greater than 150° F;
 k. mixing the low pressure potassium carbonate solution and the heated low pressure carbon dioxide; and
 l. continuing the absorption-regeneration cycle.

15. A method of generating electrical power and producing refrigeration simultaneously in a closed cycle system and performing useful work with energy rejected from the cycle consisting of the steps of:
 separating by thermal means a carrier fluid and a gaseous working fluid from a chemical solution thereof;
 causing a portion of the separated gaseous working fluid to expand to a lower pressure through a gas turbine;
 driving an electrical generator with the gas turbine thereby generating electrical power;
 causing the remainder of the separated gaseous working fluid to condense to a liquid form;
 expanding the liquid working fluid into a lower pressure;
 evaporating the liquid working fluid to its gaseous form during expansion, thereby producing refrigeration;
 reducing the pressure on the separated carrier fluid;
 combining the low pressure gaseous working fluids with the low pressure carrier fluid;
 absorbing the gaseous working fluid into the carrier fluid in an exothermic chemical reaction to restore the chemical solution to its original form;
 utilizing the released heat of reaction to perform useful work; and
 increasing the pressure of the chemical solution for reuse in succeeding cycles of operation of the system.

16. The method as defined in claim 15 in which the step of causing a portion of the separated gaseous working fluid to expand to a lower pressure includes the step of superheating the gaseous working fluid to a temperature greater than its heat of vaporization before expanding through a gas turbine.

* * * * *